US008293000B2

(12) United States Patent
Kang et al.

(10) Patent No.: US 8,293,000 B2
(45) Date of Patent: Oct. 23, 2012

(54) ANTIREFLECTIVE COATING COMPOSITION WITH STAIN RESISTANCE, ANTIREFLECTIVE COATING FILM USING THE SAME, AND ITS MANUFACTURING METHOD

(75) Inventors: Joon-Koo Kang, Daejeon (KR); Mi-Young Han, Daejeon (KR); Young-Eun Lee, Daejeon (KR); Young-Jun Hong, Daejeon (KR); Yeong-Rae Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 720 days.

(21) Appl. No.: 12/309,188

(22) PCT Filed: Jul. 6, 2007

(86) PCT No.: PCT/KR2007/003287

§ 371 (c)(1),
(2), (4) Date: Jan. 9, 2009

(87) PCT Pub. No.: WO2008/007875

PCT Pub. Date: Jan. 17, 2008

(65) Prior Publication Data

US 2009/0285993 A1 Nov. 19, 2009

(30) Foreign Application Priority Data

Jul. 10, 2006 (KR) ........................ 10-2006-0064409

(51) Int. Cl.
*C09D 5/32* (2006.01)
*C09D 183/00* (2006.01)
*B05D 3/02* (2006.01)

(52) U.S. Cl. ............. 106/287.13; 106/287.14; 427/380; 427/387

(58) Field of Classification Search .. 106/287.1–287.17; 428/380, 387
See application file for complete search history.

(56) References Cited

U.S. PATENT DOCUMENTS

| | | | | |
|---|---|---|---|---|
| 5,800,926 | A | 9/1998 | Nogami et al. | |
| 7,531,234 | B2 | 5/2009 | Nakamura et al. | |
| 2006/0057407 | A1 * | 3/2006 | Sambasivan et al. | ...... 428/472.3 |

FOREIGN PATENT DOCUMENTS

| | | | |
|---|---|---|---|
| EP | 0 776 925 | A2 | 6/1997 |
| EP | 1447 433 | A1 | 8/2004 |
| JP | 03-143975 | | 6/1991 |
| JP | 05-105424 | | 4/1993 |
| JP | 6-025599 | | 2/1994 |
| JP | 06-065529 | | 3/1994 |
| JP | 07-196342 | | 8/1995 |
| JP | 08-122501 | | 5/1996 |
| JP | 9-208898 | | 8/1997 |
| JP | 09-208898 | | 8/1997 |
| JP | 2006-28409 | A | 2/2006 |
| TW | 2004/01116 | A | 1/2004 |
| WO | WO 2005/059050 | | 6/2005 |
| WO | WO 2005/059051 | | 6/2005 |
| WO | WO 2005/101063 | A1 | 10/2005 |

* cited by examiner

*Primary Examiner* — David M Brunsman

(74) *Attorney, Agent, or Firm* — McKenna Long & Aldridge LLP

(57) ABSTRACT

An antireflective coating composition includes a hydrolytic condensate (C1) of alkoxy silane (C11) and fluoric alkoxy silane (C12); a particle-type metal fluoride (C2) with a refractive index of 1.40 or less; and a liquid dispersion-enhancing chelating agent (C3). A coating film to which the above composition is applied controls refractive index, surface energy, film strength and so on, so it ensures excellent antireflective characteristic, excellent scratch resistance, good erasure of liquid stains such as fingerprints, and particularly excellent dust removal, so it may be usefully applied to an outermost layer of a front surface of a display regardless of kind of a display substrate or presence of an additional coating layer.

11 Claims, No Drawings

ANTIREFLECTIVE COATING COMPOSITION WITH STAIN RESISTANCE, ANTIREFLECTIVE COATING FILM USING THE SAME, AND ITS MANUFACTURING METHOD

This application claims priority to PCT/KR2007/003287 filed on Jul. 6, 2007 and also Korean Patent Application No. 10-2006-0064409 filed on Jul. 10, 2006, the contents of which are hereby incorporated by reference in their entirety.

BACKGROUND OF THE INVENTION

1. Field of the Invention

The present invention relates to an antireflective coating composition, an antireflective coating film using the same, and its manufacturing method. More particularly, the present invention relates to an antireflective coating composition with excellent stain resistance and good scratch resistance, an antireflective coating film using the same, and its manufacturing method.

2. Description of the Related Art

Modern persons come in contact with various displays such as Braun tubes like CRT (Cathode-Ray Tube) for monitors and CPT (Color Picture Tube) for TV, TFT-LCD (Thin Film Transistor-Liquid Crystal Display) polarizers, PDP (Plasma Display Panel) filters, RPTS (Rear Projection TV Screen) filters, LCD for cellular phones, watches, photos, and picture frames. When exposed to light, such displays give a reflective light, causing fatigue on the eyes or headache, and also an image is not clearly formed in such displays, resulting in deteriorated contrast.

To solve such problems, a study for forming an antireflective coating film is in progress. In this study, a film having a lower refractive index than a substrate is formed on the substrate to lower reflexibility. This low refractive index film may have a single layer by vacuum deposition of magnesium fluoride ($MgF_2$) with a low refractive index or have multiple layers by laminating films with different refractive indexes. However, the vacuum technique such as vacuum deposition, used for forming a multi-layer film, requires a high cost, so it is not practical.

In this regards, Japanese Laid-open Patent Publication H5-105424 discloses a method for forming a low refractive index film by coating a coating liquid containing $MgF_2$ particles on a substrate by means of wet coating such as spinning or dipping. However, a film obtained by this method has drawbacks of seriously low mechanical strength and very bad adhesive force with the substrate, so it can be hardly used. In addition, this film has a curing temperature over 100° C., so it cannot be used for a plastic substrate made of PET (polyethylene terephthalate), PC (polycarbonate) or TAC (tri-acetylcellulose).

Meanwhile, to solve the drawbacks of the above method using a coating liquid containing $MgF_2$ particles, there are proposed other methods in Japanese Laid-open Patent Publication 1997-208898, Japanese Laid-open Patent Publication 1996-122501 and so on. These documents disclose a method for making a coating liquid with a low reflection function and a stain resistance function according to a lowered surface energy by using a compound having fluoric silane and fluoric alkyl group. However, the low reflection layer containing fluoric silane is easily electrically charged due to friction or the like by the fluoric group positioned on the film surface, so dust is easily adhered thereto, and the dust is not easily detached once it is adhered thereto. Also, this method adopts heat curing, which needs a high curing temperature or a long curing time disadvantageously.

As another prior art, Japanese Laid-open Patent Publication No. 1994-65529 discloses a method of using a conductive metal oxide film containing tin-doped indium oxide (ITO), antimony-doped tin oxide (ATO), antimony-doped zinc oxide (AZO) or the like so as to solve the problems of the low refractive index film containing fluoric silane. However, such a conductive metal oxide film generally has a high refractive index, so an excellent antireflective effect is not expected. Also, it cannot give a capability of removing liquid stain sources such as fingerprint.

These problems may be solved if good mechanical strength, good adhesion to the substrate and low curing temperature are satisfied using a coating liquid containing metal fluoride particles with a refractive index of 1.40 or less. However, a metal fluoride particle with a refractive index of 1.40 or less is generally coated by means of wet coating, not using a single deposition manner, so its mechanical strength and adhesion to the substrate are deteriorated when forming a low refractive index film. Also, such a metal fluoride particle needs a high curing temperature. In addition, when being used together with other heat-curing materials such as silane, the metal fluoride particle shows a problem in compatibility, namely easily settling down or becoming misty when forming a film, so it can be hardly used.

As mentioned above, there have been many endeavors for making an antireflective coating film capable of solving various drawbacks of bad mechanical strength, high curing temperature and low compatibility, by using a composition containing metal particles with a refractive index of 1.40 or less, which may minimize stain caused by dust with a low refractive index, and the present invention is designed under such circumstances.

SUMMARY OF THE INVENTION

The present invention is designed to solve the above problems. An object of the present invention is to provide an antireflective coating composition, which ensures excellent mechanical strength, good adhesion to a substrate, low curing temperature of 100° C. or below, and prevention of attachment of dust; an antireflective coating film using the composition; and a method for manufacturing the film.

In order to accomplish the above object, the present invention provides an antireflective coating composition, which includes a hydrolytic condensate (C1) of alkoxy silane (C11) and fluoric alkoxy silane (C12); a particle-type metal fluoride (C2) with a refractive index of 1.40 or less; and a liquid dispersion-enhancing chelating agent (C3).

In the antireflective coating composition according to the present invention, the hydrolytic condensate (C1) of the alkoxy silane (C11) and the fluoric alkoxy silane (C12) is used for enhancing strength of the coating film and adhesion to a display substrate.

The alkoxy silane (C11) is a component for giving a strength to a level required in an outermost film used in a display. The alkoxy silane (C11) may adopt 3-functional silicon compound or 4-functional silicon compound. Meanwhile, the alkoxy silane (C11) is preferably at least one selected from the group consisting of tetraethoxysilane, tetramethoxysilane, methyltrimethoxysilane, methyltriethoxysilane, glycydoxy propyl trimethoxysilane, and glycydoxy propyl triethoxysilane.

The fluoric alkoxy silane (C12) is a component for lowering a refractive index of the coating film and reducing a surface tension so as to facilitate easy removal of liquid stain sources. The fluoric alkoxy silane (C12) is preferably at least one selected from the group consisting of tridecafluorooctyltriethoxysilane, heptadecafluorodecyltrimethoxysilane, and heptadecafluorodecyltriisopropoxysilane.

The hydrolytic condensate (C1) of the alkoxy silane (C11) and the fluoric alkoxy silane (C12) is preferably prepared using sol-gel reaction. At this time, in order to keep suitable hardness and antireflective effect of the display coating film, the alkoxy silane (C11) and the fluoric alkoxy silane (C12) are preferably mixed and reacted in a weight ratio of 30:70 to 99:1.

The sol-gel reaction may adopt any method commonly used in the art. The sol-gel reaction is conducted at a reaction temperature of 0 to 150° C. for 1 to 70 hours, including alkoxy silane, fluoric alkoxy silane, catalyst, water and organic solvent.

The catalyst used in the sol-gel reaction is required for controlling a sol-gel reaction time. The catalyst preferably adopts acid such as nitric acid, hydrochloric acid and acetic acid, and more preferably additionally contains salt such as zirconium and indium in the shape of hydrochloride, nitrates, sulfate or acetate. At this time, the content of the catalyst is preferably 0.01 to 40 parts by weight, when the alkoxy silane and the fluoric alkoxy silane are 100 parts by weight in sum.

In addition, the water used in the sol-gel reaction is a component required for hydrolysis and condensation. The content of water is preferably 0.01 to 100 parts by weight, when the alkoxy silane and the fluoric alkoxy silane are 100 parts by weight in sum.

Also, the organic solvent used in the sol-gel reaction is a component for controlling a molecular weight of the hydrolytic condensate. The organic solvent is preferably alcohols, cellosolves, or a mixed solvent containing at least two selected from them. At this time, the content of the organic solvent is preferably 0.01 to 500 parts by weight, when the alkoxy silane and the fluoric alkoxy silane are 100 parts by weight in sum.

In the antireflective coating composition according to the present invention, the metal fluoride (C2) is in a particle-type powder shape with an average particle size of 10 to 100 nm, and it is preferably at least one selected from the group consisting of NaF, LiF, $AlF_3$, $Na_5Al_3F_{14}$, $Na_3AlF_6$, $MgF_2$ and $YF_3$.

Preferably, 0.5 to 30 parts by weight of the metal fluoride (C2) is used, based on 100 parts by weight of the hydrolytic condensate (C1) of the alkoxy silane (C11) and the fluoric alkoxy silane (C12). That is to say, the content of the metal fluoride is preferably 0.5 or more parts by weight so as to give a low reflection characteristic to the coating film, and 30 or less parts by weight so as to keep strength of the coating film and adhesion to a substrate.

In the antireflective coating composition according to the present invention, the dispersion-enhancing chelating agent (C3) is a component for improving compatibility of the metal fluoride (C2) and the hydrolytic condensate (C1) containing the alkoxy silane (C11) and the fluoric alkoxy silane (C12) so as to prevent the coating film from becoming misty when being formed. The dispersion-enhancing chelating agent (C3) is preferably at least one selected from the group consisting of $Mg(CF_3COO)_2$, $Na(CF_3COO)$, $K(CF_3COO)$, $Ca(CF_3COO)_2$, $Mg(CF_2COCHCOCF_3)_2$ and $Na(CF_2COCHCOCF_3)$.

Preferably, 0.1 to 30 parts by weight of the dispersion-enhancing chelating agent (C3) is used, based on 100 parts by weight of the hydrolytic condensate (C1) of the alkoxy silane (C11) and the fluoric alkoxy silane (C12). That is to say, the content of the dispersion-enhancing chelating agent (C3) is preferably 0.1 or more parts by weight so as to prevent the metal fluoride particles from easily lumping and thus making the coating film misty, and also preferably 30 or less parts by weight so as to keep strength of the coating film and adhesion to a substrate.

The antireflective coating composition according to the present invention may further include organic solvent (C4) when required.

The organic solvent (C4) may be selectively used in consideration of a drying temperature and a curing temperature, and preferably adopts a single solvent or a mixed solvent containing at least one selected from the group consisting of alcohols, cellosolves and ketones. Meanwhile, the organic solvent (C4) is more preferably at least one selected from the group consisting of methanol, ethanol, propanol, butanol, ethyl cellosolve, butyl cellosolve, hexyl cellosolve, methyl cellosolve, isopropoxy cellosolve, acetone, methylethylketone, diacetone alcohol, n-methylpyrrolidinon, and methyl isobutylketone.

The organic solvent (C4) may be used as a diluting solvent that makes the antireflective coating composition have a solid content of 0.1 to 30 weight %.

In another aspect of the present invention, there is also provided an antireflective coating film, which is manufactured using the antireflective coating composition described as above.

That is to say, the antireflective coating composition of the present invention may be used as a material of an antireflective coating layer, and also a hard coating layer or a high refractive index layer may be further included thereto to make a multi-layer structure.

A display substrate commonly used in the art is a glass substrate, a plastic substrate, a plastic film or the like, and a coating method of the composition may be freely selected according the kind of substrate. In addition, the hard coating layer may adopt a UV-curable resin, or inorganic nano particles may be dispersed in the UV-curable resin so as to improve abrasion resistance.

A thickness of the antireflective coating film of the present invention is determined according to refractive indexes of the used display substrate and other material layers and a wavelength of incident light, so it is not specially limited. But, the thickness of the antireflective coating film is preferably 50 to 200 nm.

For example, in case a hard coating layer and an antireflective coating layer are coated on the display substrate, assuming that the hard coating layer has a refractive index of 1.51, the antireflective coating layer has a refractive index of 1.38 and a designed wavelength of the incident light is 550 nm, it is preferable that the antireflective coating layer is coated in a thickness of 100 nm according to the optical design. In addition, the refractive index of the antireflective coating layer is generally preferable as it is lower. In particular, as a difference of refractive indexes between the antireflective coating layer and a lower layer is great, the antireflective effect is increased.

In still another aspect of the present invention, there is also provided a method for manufacturing an antireflective coating film, which includes (S1) coating the antireflective coating composition described as above on a display substrate to have a dried thickness of 50 to 200 nm; (S2) drying the coated display substrate, prepared in the step (S1), at 5 to 150° C. for 0.1 to 30 minutes; and (S3) curing the dried coated display substrate, prepared in the step (S2), at a normal temperature for at least 12 hours.

The method for manufacturing an antireflective coating film according to the present invention will be explained later in more detail.

DESCRIPTION OF THE PREFERRED EMBODIMENT

Hereinafter, preferred embodiments of the present invention will be described in detail based on embodiments. However, the embodiments of the present invention may be modified in various ways, and the scope of the present invention should be not interpreted as being limited to the embodiments. The embodiments of the present invention are provided just for explaining the present invention more perfectly to those having ordinary skill in the art.

As seen from the following Table 1, compositions having components and contents classified into embodiments 1 and 2 and comparative examples 1 to 3 were prepared, and coating films were manufactured using the compositions.

Embodiment 1

A mixture containing 70 g of tetraethoxysilane, 30 g of heptadecafluorodecyltrimethoxysilane, 10 g of water, 10 g of hydrochloric acid and 200 g of ethanol was sol-gel reacted at a reaction temperature of 78° C. for 3 hours. After the reaction, the mixture was cooled to a normal temperature, added with 150 g of 10% $MgF_2$ dispersing agent (Nissan MFS-10P) and 15 g of magnesium tri-fluoro acetate, and then diluted with 100 g of ethyl cellosolve and 100 g of ethanol.

The antireflective coating composition prepared as above was coated on a hard coating film by means of roll coating to have a dried thickness of 100 nm. The coated film was dried for 5 minutes in an oven at 90° C., and then cured at a normal temperature for 24 hours.

Embodiment 2

A mixture containing 85 g of tetraethoxysilane, 15 g of heptadecafluorodecyltrimethoxysilane, 10 g of water, 10 g of hydrochloric acid and 200 g of ethanol was sol-gel reacted at a reaction temperature of 78° C. for 3 hours. After the sol-gel reaction, the mixture was cooled to a normal temperature, added with 250 g of 10% $MgF_2$ dispersing agent (Nissan MFS-10P) and 25 g of magnesium tri-fluoro acetate, and then diluted with 100 g of ethyl cellosolve and 100 g of ethanol.

The antireflective coating composition prepared as above was coated and cured in the same way as the embodiment 1.

Comparative Example 1

An antireflective coating film was made, which was coated with an antireflective coating composition prepared in the same way as the embodiment 1, except that 100 g of 10% $MgF_2$ dispersing agent (Nissan MFS-10P) was used and magnesium tri-fluoro acetate acting as a dispersion-enhancing chelating agent was not used.

Comparative Example 2

An antireflective coating film was made, which was coated with an antireflective coating composition prepared in the same way as the embodiment 1, except that heptadecafluorodecyltrimethoxysilane was not added and 100 g of tetraethoxysilane was used in the sol-gel reaction.

Comparative Example 3

An antireflective coating film was made, which was coated with an antireflective coating composition prepared in the same way as the embodiment 1, except that magnesium fluoride acting as metal fluoride with a refractive index of 1.40 or less and magnesium tri-fluoro acetate acting as a dispersion-enhancing chelating agent were not used.

TABLE 1

| | | Contents (parts by weight) | | | | |
|---|---|---|---|---|---|---|
| | | Embodiments | | Comparative Examples | | |
| | | 1 | 2 | 1 | 2 | 3 |
| Condensation | tetraethoxysilane | 70 | 85 | 70 | 100 | 70 |
| | heptadecafluorodecyltrimethoxysilane | 30 | 15 | 30 | — | 30 |
| | water | 10 | 10 | 10 | 10 | 10 |
| | hydrochloric acid | 10 | 10 | 10 | 10 | 10 |
| | ethanol | 200 | 200 | 200 | 200 | 200 |
| 10% $MgF_2$ dispersing agent | | 150 | 250 | 100 | 150 | — |
| magnesium tri-fluoro acetate | | 15 | 25 | — | 15 | — |
| ethyl cellosolve | | 100 | 100 | 100 | 100 | 100 |
| ethanol | | 100 | 100 | 100 | 100 | 100 |

EXPERIMENTAL EXAMPLES

For the coating films manufactured by the embodiments 1 and 2 and the comparative examples 1 to 3, adhesion to a substrate, pen erasure, stain removal, scratch resistance, reflectivity and brilliance were respectively measured to evaluate easiness of stain removal and optical features of each coating film relatively.

Experimental Example 1

Adhesion to a Substrate

After a cut portion in a check pattern with 10 horizontal and vertical lines at 1 mm intervals was formed in the coating film, obtained by coating and curing according to JIS K5400, a cellophane adhesive tape (Cellotape, Nichiban Co., Ltd.) was strongly attached thereto, and then one end of the tape was gripped and strongly pulled in a direction perpendicular to its surface. After that, exfoliation of the hard coating layer was observed by the naked eyes, which was evaluated as "good" when the hard coating layer was not exfoliated and "bad" when exfoliated.

Experimental Example 2

Pen Erasure

Pen erasure was observed by the naked eyes while writing letters on the coating film using an oil-based pen and then rubbing it with a cotton stuff, which was evaluated as "good" when the letters were well erased and "bad" when not well erased.

Experimental Example 3

Dust Removal

After rubbing the coating film with a size of 10×10 cm in length and width 20 times reciprocally using a cotton stuff, powder was sprayed thereto at a distance of 30 cm 5 times at 1 minute intervals. Air of 2 atm was blown to the coating surface on which the powder was piled up, for 10 seconds, and then remaining powder was observed by the naked eyes, which was classified into "good" when the remaining powder is small and "bad" when the remaining powder is great.

Experimental Example 4

Scratch Resistance

The coating film was scrubbed using an abrader having a steel wool (#0000) with a load of 250 g, and then observed to check whether any scratch was made. The result is classified into "good" if the scratch resistance is strong, "normal" if the scratch resistance is normal, and "bad" if the scratch resistance is weak.

Experimental Example 5

Reflectivity

A rear side of the coating film was processed into black, and then its reflectivity was measured using a spectrophotometer, produced by N&K, to find a minimum reflectivity as indicated in the following Table 2, so as to evaluate reflection properties.

Experimental Example 6

Brilliance (Haze)

A hazemeter was used to measure a haze of the coating film, and its result is indicated in the following Table 2.

TABLE 2

| | | Adhesion to substrate | Pen erasure | Scratch resistance | Dust removal | Minimum reflectivity (%) | Haze (%) |
|---|---|---|---|---|---|---|---|
| Embodiment | 1 | good | good | good | good | 2.0 | 0.3 |
| | 2 | good | good | good | good | 1.8 | 0.3 |
| Comparative | 1 | good | good | bad | good | — | 3.0 |
| Example | 2 | good | bad | good | good | — | 1.5 |
| | 3 | good | good | good | bad | 2.2 | 0.3 |

As seen from the Table 2, it would be understood that the coating films prepared according to the embodiment 1 and 2 uses the composition containing metal fluoride and dispersion-enhancing chelating agent together, and they are excellent in adhesion to a substrate, scratch resistance, dust removal and reflectivity when compared with the comparative examples 1 to 3. Also, it would be understood that the coating film according to the comparative example 1, not containing the dispersion-enhancing chelating agent, becomes misty, and the coating film according to the comparative example 2, not containing the fluoric silane, becomes misty and shows deteriorated pen erasure. Also, it would be understood that the coating film according to the comparative example 3, not using a low refractive index filler, shows weak dust removal due to static electricity caused by fluoric alkoxysilane.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

APPLICABILITY TO THE INDUSTRY

As described above, the antireflective coating composition according to the present invention is excellent in the antireflective property and also excellent in scratch resistance and erasure of liquid stain materials such as fingerprints. In particular, the antireflective coating composition according to the present invention may be usefully applied to an outermost layer of a front surface of a display regardless of kind of a display substrate or presence of an additional coating layer.

What is claimed is:

1. An antireflective coating composition, comprising:

a hydrolytic condensate of alkoxy silane and fluoric alkoxy silane;

particulate metal fluoride with a refractive index of 1.40 or less; and a liquid dispersion-enhancing chelating agent.

2. The antireflective coating composition according to claim 1, wherein the composition comprises, based on 100 parts by weight of the hydrolytic condensate:

0.5 to 30 parts by weight of the metal fluoride; and 0.1 to 30 parts by weight of the dispersion-enhancing chelating agent.

3. The antireflective coating composition according to claim 2, further comprising: organic solvent that makes the antireflective coating composition have a solid content of 0.1 to 30 weight %.

4. The antireflective coating composition according to claim 3, wherein the organic solvent is a single solvent containing at least one or a mixed solvent containing at least two selected from the group consisting of alcohols, cellosolves and ketones.

5. The antireflective coating composition according to claim 4, wherein the alcohol selected as the organic solvent is at least one selected from the group consisting of methanol, ethanol, propanol, and butanol, wherein the cellosolve selected as the organic solvent is at least one selected from the group consisting of ethyl cellosolve, butyl cellosolve, hexyl cellosolve, methyl cellosolve, and isopropoxy cellosolve, and wherein the ketone selected as the organic solvent is at least one selected from the group consisting of acetone, methylethylketone, diacetone alcohol, n-methylpyrrolidinon, and methyl isobutylketone.

6. The antireflective coating composition according to claim 1, wherein, in the hydrolytic condensate, the alkoxy silane and the fluoric alkoxy silane are hydrolytic-condensed in a weight ratio of 30:70 to 99:1.

7. The antireflective coating composition according to claim 1, wherein the alkoxy silane is at least one selected from the group consisting of tetraethoxysilane, tetramethoxysilane, methyltrimethoxysilane, methyltriethoxysilane, glycydoxy propyl trimethoxysilane, and glycydoxy propyl triethoxysilane, and wherein the fluoric alkoxy silane is at least one selected from the group consisting of tridecafluorooctyltriethoxysilane, heptadecafluorodecyltrimethoxysilane, and heptadecafluorodecyltriisopropoxysilane.

8. The antireflective coating composition according to claim 1, wherein the metal fluoride has an average particle size of 10 to 100 nm.

9. The antireflective coating composition according to claim 1, wherein the metal fluoride is at least one selected from the group consisting of NaF, LiF, $AlF_3$, $Na_5Al3F_{14}$, $Na_3AlF_6$, $MgF_2$ and $YF_3$.

10. The antireflective coating composition according to claim 1, wherein the dispersion-enhancing chelating agent is at least one selected from the group consisting of $Mg(CF_3COO)_2$, $Na(CF_3COO)$, $K(CF_3COO)$, $Ca(CF_3COO)_2$, $Mg(CF_3COCHCOCF_3)_2$ and $Na(CF_2COCHCOCF_3)$.

11. A method for manufacturing an antireflective coating film, comprising:

(S1) coating the antireflective coating composition defined in any one of the claims 1 to 10 on a display substrate to have a dried thickness of 50 to 200 nm;

(S2) drying the coated display substrate, prepared in the step (S1), at 5 to 150° C. for 0.1 to 30 minutes; and (S3) curing the dried coated display substrate, prepared in the step (S2), at a normal temperature for at least 12 hours.

* * * * *